(12) United States Patent
Yoon

(10) Patent No.: US 9,788,266 B2
(45) Date of Patent: Oct. 10, 2017

(54) WIRELESS COMMUNICATION APPARATUS AND METHOD THEREOF

(71) Applicant: SAMSUNG ELECTRONICS CO., LTD., Suwon-si, Gyeonggi-do (KR)

(72) Inventor: Suk-un Yoon, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/986,061

(22) Filed: Dec. 31, 2015

(65) Prior Publication Data

US 2016/0198396 A1 Jul. 7, 2016

(30) Foreign Application Priority Data

Jan. 7, 2015 (KR) .......................... 10-2015-0002024

(51) Int. Cl.
*H04W 4/00* (2009.01)
*H04W 48/16* (2009.01)
*H04W 72/00* (2009.01)

(52) U.S. Cl.
CPC .......... *H04W 48/16* (2013.01); *H04W 4/008* (2013.01); *H04W 72/00* (2013.01)

(58) Field of Classification Search
USPC ...................................................... 455/434
See application file for complete search history.

(56) References Cited

U.S. PATENT DOCUMENTS

| 8,527,014 B2 * | 9/2013 | Amerga | H04W 52/0229 455/229 |
| 8,868,097 B2 | 10/2014 | Kwon et al. | |
| 2010/0273504 A1 * | 10/2010 | Bull | G01S 5/02 455/456.1 |
| 2012/0149412 A1 * | 6/2012 | Nergis | H04B 1/525 455/501 |
| 2015/0004966 A1 * | 1/2015 | Ayleni | H04W 36/0005 455/433 |

FOREIGN PATENT DOCUMENTS

| KR | 10-1366534 | 2/2014 |
| KR | 10-2014-0097879 | 8/2014 |

* cited by examiner

*Primary Examiner* — Joel Ajayi
(74) *Attorney, Agent, or Firm* — Nixon & Vanderhye, P.C.

(57) ABSTRACT

Provided are wireless communication apparatuses. A method of communicating includes scanning a wireless frequency band in use in a scanning range of the wireless communication apparatus, generating a database that includes use information of the wireless frequency band based on the scanned wireless frequency band and communicating with a device using the scanned wireless frequency band using the database.

18 Claims, 9 Drawing Sheets

FIG. 6

| FREQUENCY BANDWIDTH | SIGNAL STRENGTH | TYPE | ADDRESS | OTHERS |
|---|---|---|---|---|
| 20-22000Hz | -30db<br>-50db | voice | N/a | N/a |
| 800MHz | -50db | Wireless phone | N/a | N/a |
| 2.4GHz | -40db<br>-60db | WIFI | **********<br>******** | Channel 1<br>Channel 7 |
| 2.4G ~ 2.5G[Hz] | -70db | Bluetooth | ********** | User : Tom |

WIRELESS COMMUNICATION APPARATUS AND METHOD THEREOF

CROSS-REFERENCE TO RELATED APPLICATION

This application is based on and claims priority under 35 U.S.C. §119 to Korean Patent Application No. 10-2015-0002024, filed on Jan. 7, 2015, in the Korean Intellectual Property Office, the disclosure of which is incorporated by reference herein in its entirety.

BACKGROUND

1. Field

The disclosure relates to a wireless communication apparatus, and for example, to wireless communication apparatus that uses a database after constructing the database based on scanning audio/radio bandwidth frequencies of peripheral devices and methods thereof.

2. Description of Related Art

Wireless communication apparatuses use some of frequency bands for data transmissions. For example, wireless fidelity (Wi-Fi) terminals use a channel of 2.4 GHz or 5 GHz frequency band for data transmission. In the case of Bluetooth, a frequency hopping method is used based on the 2.4 GHz frequency band. The frequency hopping is a technique of transmitting data piece by piece using a specific pattern in a number of channels.

However, as the use of wireless channels in wireless communication apparatuses increases, a frequency shortage problem has occurred. Accordingly, various methods to increase the efficiency of using frequency have been proposed.

SUMMARY

Aspects of the disclosure address at least the above-mentioned problems and/or disadvantages and provide at least the advantages described below. Accordingly, an aspect of the disclosure is to provide a wireless communication apparatus that obtains information of peripheral communication environments through analyzing received audio/radio frequency bands and generates a database based on the obtained information to increase frequency using efficiency.

Additional aspects will be set forth in part in the description which follows and, in part, will be apparent from the description.

According to an aspect of an example embodiment, a wireless communication apparatus using a wireless frequency band, includes: communication circuitry configured to scan a wireless frequency band that is in use and within a scanning range of the wireless communication apparatus; and a controller configured to generate a database including use information of the wireless frequency band based on information of a frequency band of the scanned wireless frequency band in use, wherein the communication circuitry is configured to communicate with a device using the scanned wireless frequency band using the database.

The use information may include a scanned frequency bandwidth in use, a strength of a signal found based on the scan, a type of device found based on the scan and a media access control (MAC) address of the device, and a Bluetooth device (BD) address of the device.

The scanning of the wireless frequency band by the communication circuitry may include at least one of scanning a Wi-Fi channel using a Wi-Fi module, scanning a Bluetooth channel using a Bluetooth module, and scanning an audible frequency band and a non-audible frequency band using a microphone (MIC).

The communication circuitry may be configured to re-scan the wireless frequency band in use, and the controller may be configured to update the database based on a result of the re-scanning.

The controller may be configured to search for hardware that is able to sense a wireless signal, and the communication circuitry may be configured to scan the wireless frequency band in use using hardware found based on the search.

The communication circuitry may be configured to scan a wireless signal of the wireless frequency band in use using a single defined ratio (SDR) device connected to the wireless communication apparatus, and may be configured to determine a protocol of the wireless signal using the scanned wireless signal and an SRD database.

The communication circuitry may be configured to scan a 3G/LTE frequency band in use using a 3G/LTE dongle.

The controller may be configured to select at least one frequency bandwidth from unused frequency bandwidths using the database, and the communication circuitry may be configured to communicate using the at least one selected frequency bandwidth.

The controller may be configured to determine a device using the wireless frequency bandwidth using the database, and the communication circuitry may be configured to transmit an advertisement to the determined device.

The communication circuitry may be configured to re-scan the wireless frequency bandwidth in use, and the controller may be configured to transmit a security signal by controlling the communication circuitry when it is determined by the communication circuitry that a device that uses the wireless frequency band in use is not registered in the database.

According to an aspect of an example embodiment, a method of communication using a wireless communication apparatus, the method includes: scanning a wireless frequency band in use and within a scanning range of the wireless communication apparatus; generating a database that comprises use information of the wireless frequency band based on the scanned wireless frequency band; and communicating with a device using the scanned wireless frequency band using the database.

The scanning of the wireless frequency band may include at least one of scanning a Wi-Fi channel using a Wi-Fi module, scanning a Bluetooth channel using a Bluetooth module, and scanning an audible frequency band and a non-audible frequency band using a MIC.

The method may further include re-scanning the wireless frequency band in use, and updating the database based on a result of the re-scanning.

The method may further include searching for hardware that is able to sense a wireless signal, and the scanning of the wireless frequency band may include scanning a wireless frequency band in use using hardware found based on the search.

The scanning of the wireless frequency band may include scanning a wireless signal of the wireless frequency band in use using a single defined radio (SDR) device connected to the wireless communication apparatus, and determining a protocol of the wireless signal using the scanned wireless signal and an SDR database.

The scanning of the wireless frequency band may include scanning a 3G/LTE frequency band in use using a 3G/LTE dongle.

The communicating using the database may further include: selecting at least one frequency bandwidth from unused frequency bandwidths; and communicating using the at least one selected frequency band.

The communicating using the database may further include determining a device using the wireless frequency band, using the database, and transmitting an advertisement to the determined device.

The method may further include re-scanning the wireless frequency band in use, the communicating using the database may include transmitting a security signal when it is determined that a device that uses the wireless frequency bandwidth in use, but is not registered in the database, is found during the re-scanning.

According to an aspect of an example embodiment a non-transitory computer readable medium for storing a computer program configured to be readable by at least one processor for providing instructions to the at least one processor to execute a computer process for performing the method described above.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 6 is an illustration of a database table;

DETAILED DESCRIPTION

Figure 1:
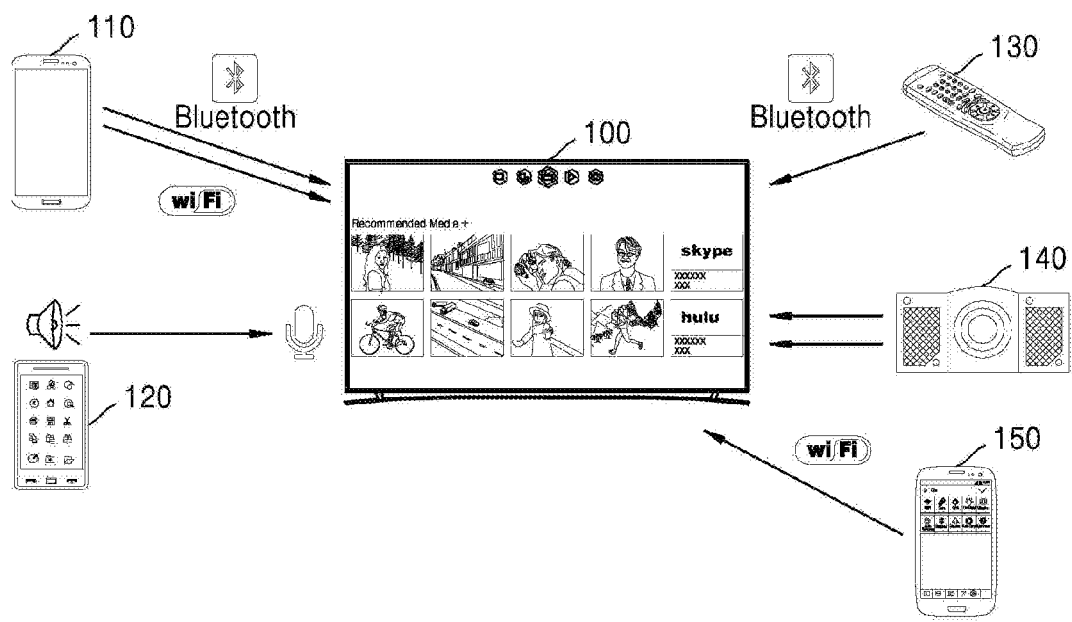
FIG. 1 is a diagram illustrating an example communication environment between a digital TV and peripheral devices.

Reference will now be made in greater detail to example embodiments, examples of which are illustrated in the accompanying drawings, wherein like reference numerals refer to like elements throughout. To facilitate understanding, identical reference numerals have been used, where possible, to designate identical elements that are common to the figures. In describing the example embodiments, example characteristics are disclosed to facilitate the understanding of the example embodiments. Also, in describing the disclosure, when practical descriptions with respect to a related known function and configuration may unnecessarily make the scope of the disclosure unclear, the descriptions thereof will be omitted.

The terminologies used herein will be briefly described, and will be described in greater detail in the examples.

All terms used herein are selected as widely used general terms in consideration of functions in the example embodiments. However, the terminologies may vary according to the understanding of ordinary skill in the art, precedents, or the disclosure of a new technology. Also, in an example case, the terms may be arbitrarily selected. For example, the meaning of the term may be described in detail in the corresponding examples. Accordingly, all terms used in the current example embodiments should be defined by not simply the name of the terms but the meaning of the terms together with the meaning gleaned from the example embodiments.

It will be understood that when a part "comprises" or "includes" a constituent element, the part does not exclude but may further include another constituent element. Also, terms such as "unit" or "module" described in the disclosure may denote or refer to one unit that processes at least one function or an operation, and may be realized by hardware (e.g., circuitry) or software or combining hardware and software.

In the disclosure, communication includes a broad sense communication and a narrow sense communication. The broad sense communication may denote or refer to all behaviors raised by transmitting and receiving signals. For example, transmitting an advertisement through a wireless fidelity (Wi-Fi) or a transmitting alarm signal via a speaker using a BUS may be included in the broad sense communication. An action of transmitting or receiving a signal may be included, for example, in the narrow sense communication.

Throughout the disclosure, a "scan" may include "sensing". Also, throughout the disclosure, "the scanning of a bandwidth or a frequency" may refer to sensing an apparatus that uses the corresponding bandwidth or frequency.

Hereinafter, example embodiments of the disclosure will be described in greater detail with reference to the accompanying drawings.

FIG. 1 is a diagram illustrating an example communication environment between a digital TV and peripheral devices.

Referring to FIG. 1, a digital TV 100 on which, for example, a Wi-Fi module, a Bluetooth module, and a MIC are mounted may have wireless communication with peripheral devices 110, 120, 130, 140, 150. For example, at a home or office, various electronic devices that use various wireless communication techniques on a peripheral of a digital TV have been developed. The electronic devices use an audio frequency or a radio frequency band for transmitting and receiving information. For example, the radio frequency band may be used for wireless data communication. An audio (audible) frequency band and ultrasonic wave (non-audible) frequency band may also be used as an information transmission media.

As the wireless communication technique has been developed, the number of wireless communication apparatuses connected to each other is increased. Accordingly, for the wireless communication to be conducted with a favorable quality, the wireless communication apparatuses may consider interferences with other wireless communication apparatuses.

According to an example of the disclosure, a database or big data may be created and used by scanning devices that use the wireless communication techniques around the wireless communication apparatus. "Around" may refer to a range in which the peripheral devices are visible to the wireless communication apparatus, e.g., within a scanning range of the wireless communication device, and can communicate with the wireless communication apparatus. A scanning range may also refer to, for example, a communicable range, a communication proximity, a scanning proximity, etc. These terms may be used interchangeably in the following description and claims to denote peripheral or other devices that may be referred to as being around or are visible to the wireless communication apparatus.

The scanning of audio/radio frequency bands around a wireless communication apparatus, for example, a digital TV 100 may be, for example, realized by adding software without adding hardware to the wireless communication apparatus.

For example, if hardware of a Wi-Fi module, a Bluetooth module, and a MIC is mounted on a digital TV 100, information of a Wi-Fi device 110, 150, a Bluetooth device 130, an ultrasonic wave generation device 120, and an audible bandwidth sonic generator etc. which are located around the digital TV 100 may be collected by adding software that scans audio/radio frequency bands to the digital TV 100. Based on the collected information, the digital TV 100 may form a radio frequency (RF)/audio frequency (AF) map of the peripheral devices, for example, in the form of a database. The digital TV 100 may provide additional services based on the RF/AF map.

In FIG. 1, a digital TV 100 is depicted as an example of a wireless communication apparatus of the disclosure. However, the wireless communication apparatus according to an example of the disclosure is not limited to the digital TV 100.

A wireless communication apparatus according to an example of the disclosure may include electronic devices, for example, digital TVs, Access Points (APs), or smart phones, etc.

Figure 2:
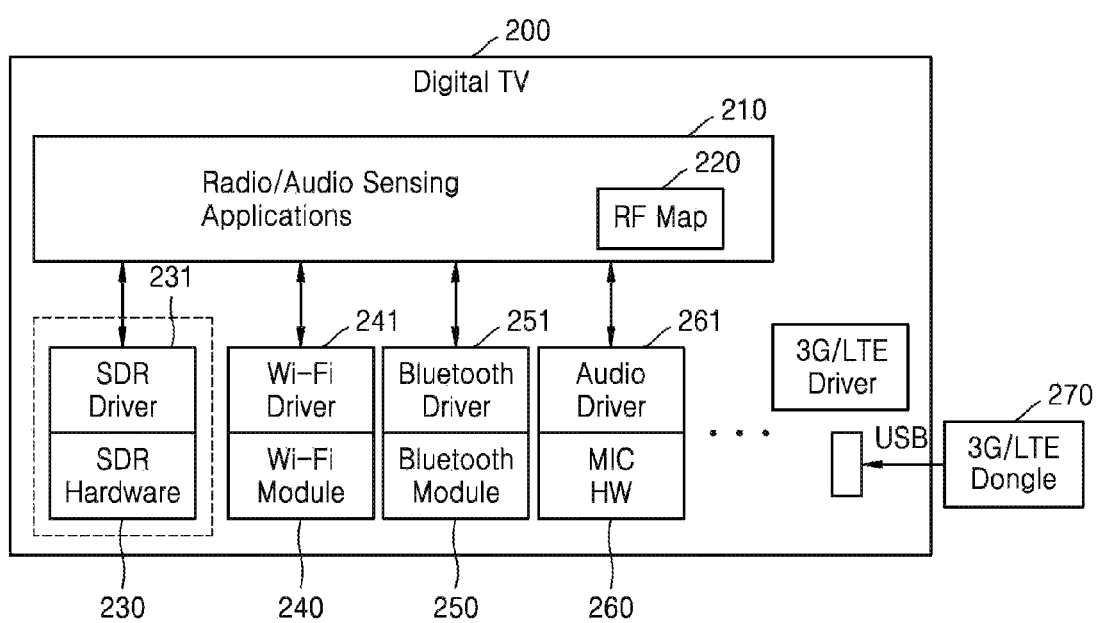
FIG. 2 is a block diagram illustrating an example apparatus for scanning audio/radio frequency bands.

FIG. 2 is a block diagram illustrating an example digital TV 200 that scans audio/radio frequency bands, according to an example of the disclosure. Referring to FIG. 2, the digital TV 200 includes a Wi-Fi module 240 and a Wi-Fi driver 241, a Bluetooth module 250 and a Bluetooth driver 251, a MIC and hardware 260 and an audio driver 261.

The scanning frequency band and the method of scanning may be changed based on hardware of the digital TV 200. For example, if a 3d generation (3G)/long term evolution (LTE) dongle 270 is not included in the digital TV 200, the scanning frequency band of the digital TV 200 may include a Wi-Fi frequency band, a Bluetooth frequency band, and/or an audio frequency band (or a sound wave frequency band) that is capable of being sensed by a MIC. When the 3G/LTE dongle 270 is connected as a universal serial bus (USB) module of the digital TV 200, the scanning frequency band of the digital TV 200 may include the a Wi-Fi frequency band, the Bluetooth frequency band, the audio frequency band that is capable of being sensed by a MIC, and/or the 3G/LTE frequency band.

The digital TV 200 may scan frequency bands described above using the Wi-Fi module 240 and the Wi-Fi driver 241, the Bluetooth module 250 and the Bluetooth driver 251, and the MIC hardware 260 and the audio driver 261 without necessarily adding additional hardware. In order to scan additional frequency bands, the digital TV 200 may further include Software Defined Radio (SDR) hardware 230 and an SDR driver 231 for driving the SDR hardware 230.

When the digital TV 200 includes the SDR hardware 230 and the SDR driver 231, the digital TV 200 may scan all frequency bands that are detectable by the SDR hardware 230. When the SDR hardware 230 and the SDR driver 231 are used, the digital TV 200 may need information about what type of wireless communication apparatus and what type of frequency band are used. For example, the digital TV 200 may need information that a wireless communication apparatus that uses a frequency band of 800 MHz in Korea is a wireless telephone.

As a result of scanning the frequency band described above, frequency use information of the peripheral wireless communication apparatuses around the digital TV 200 may be sensed. The frequency use information may include, for example, a scanned frequency bandwidth in use, the intensity of a scanned signal, the type of scanned wireless communication apparatus, a Wi-Fi Media Access Control (MAC) address, and/or a Bluetooth device (BD) address, etc.

For example, the frequency use information about the peripheral wireless communication apparatuses may include: through the scanning of frequency bandwidth, the types of frequency bandwidths being used; the intensity of signals; whether a Wi-Fi communication method or a Bluetooth communication method is used, or another type of communication method is used; if the Wi-Fi communication method is used, what is the MAC address; and if the Bluetooth communication method is used, what is the BD address.

According to an example of the disclosure, a database (for example, an RF map 220) that includes the frequency use information may be generated in a radio/audio sensing application 210 and the database may be used in a broad sense communication. The RF map may, for example, comprise a Table, a frequency map, or a graph, or the like. However, the type of the RF map of the disclosure is not limited thereto.

Figure 3:
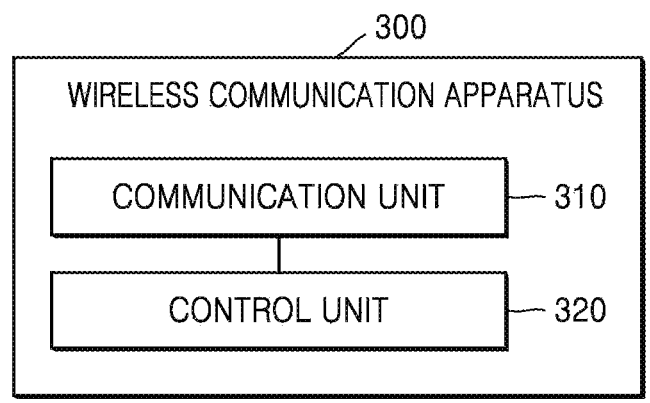
FIG. 3 is a block diagram illustrating an example wireless communication apparatus.

FIG. 3 is a block diagram illustrating an example wireless communication apparatus 300.

The wireless communication apparatus 300 illustrated in FIG. 3 may denote any type of electronic device that includes a communication module. For example, the wireless communication apparatus 300 may be the digital TV 200 that includes the Wi-Fi module 240 and the Wi-Fi driver 241, the Bluetooth module 250 and the Bluetooth driver 251, and the MIC hardware 260 and the audio driver 261. However, the wireless communication apparatus 300 according to an example of the disclosure is not limited thereto, and may include all types of electronic devices, such as, for example, a smart phone and personal digital assistant (PDA), or the like. The wireless communication apparatus 300 described in FIG. 3 may be simply referred to as a communication apparatus.

Referring to FIG. 3, the wireless communication apparatus 300 may include a communication unit (e.g., including communication circuitry) 310 and a control unit (e.g., including a controller) 320.

According to an example of the disclosure, the communication unit 310 may include communication circuitry configured to scan wireless frequency bands within a scanning range of the wireless communication apparatus 300. For example, the communication unit 310 may be configured to scan a Wi-Fi channel using a Wi-Fi module, may be configured to scan a Bluetooth channel using a Bluetooth module, and/or may be configured to scan audible frequency bands or non-audible frequency bands using a MIC.

Also, the communication unit 310, after a database is generated by scanning, based on a request or a frequency set in advance, the wireless frequency band in use may be re-scanned, and the database may be updated based on the re-scanned result.

The control unit 320 may be configured to control overall operation of the wireless communication apparatus 300.

The control unit 320 may be configured to generate a database that indicates frequency use information of the wireless frequency bands based on information of scanned wireless frequency bandwidths in the scanning range. The frequency use information may include scanned frequency bands in use, the intensity of scanned signals, the types of scanned wireless communication apparatus, a Wi-Fi MAC address, and/or a BD address.

Figure 4:
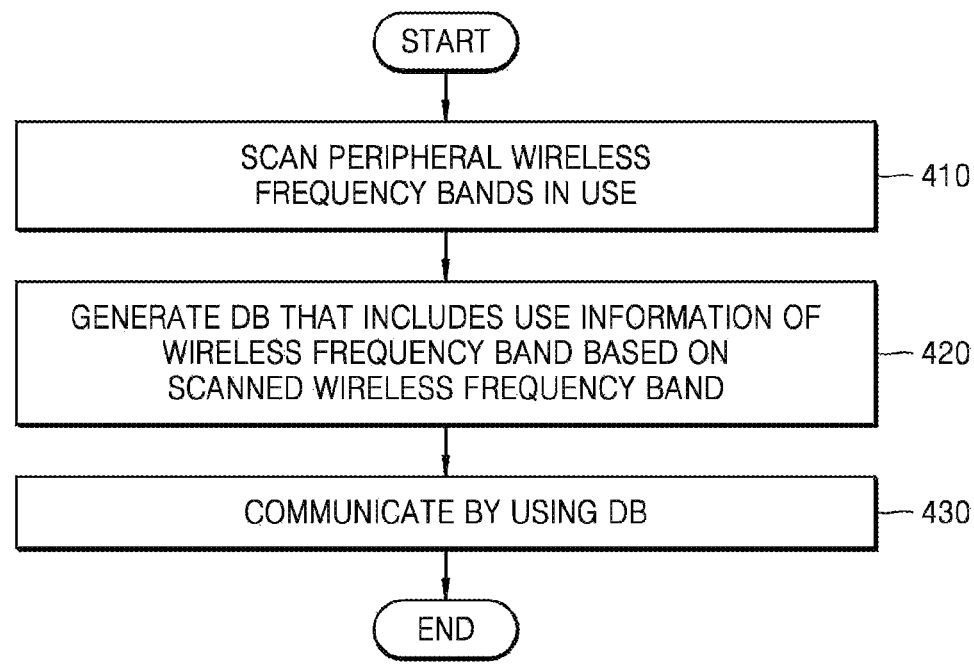
FIG. 4 is a flowchart illustrating an example method of communication using a wireless communication.

FIG. 4 is a flow chart illustrating an example method of communication by using a wireless communication in a scanning range.

In operation 410, the wireless communication apparatus 300 scans a scanning range of peripheral wireless frequency band in use. The scanning of the scanning range wireless frequency band in use may, for example, refer to scanning a Wi-Fi channel using a Wi-Fi module, scanning a Bluetooth channel using a Bluetooth module, and/or scanning audible frequency bands or non-audible frequency bands using a MIC.

In operation 420, the wireless communication apparatus 300 may generate a database that includes, for example, frequency use information of the wireless frequency bands based on information of scanned wireless frequency bands.

In operation 430, the wireless communication apparatus 300 may communicate using the information included in the generated database. The communication may, for example, refer to a broad sense communication. For example, the wireless communication apparatus 300 may transmit and receive data without or by substantially avoiding collision using the information included in the generated database. For example, the wireless communication apparatus 300 may detect frequency bandwidths in use, may select at least one frequency band from non-used frequency bandwidths, and may transmit and receive data using the selected frequency bandwidth.

The wireless communication apparatus 300 may transmit an advertisement to other wireless communication apparatuses that use frequency bandwidths using the information included in the generated database.

The wireless communication apparatus 300 transmit an alarm signal (or a warning signal) when a wireless communication apparatus that is not included in the database is detected through a re-scanning process. For example, the wireless communication apparatus 300 may transmit an alarm by transmitting an alarm signal to a speaker. The speaker may be included in the wireless communication apparatus 300 or may be disposed on an outside of the wireless communication apparatus 300. When the speaker is disposed outside the wireless communication apparatus 300, the speaker may be disposed at a location, such as the user of the wireless communication apparatus 300, the user of another wireless communication apparatus, the police station, or an organization to be transmitted the alarm.

Figure 5:
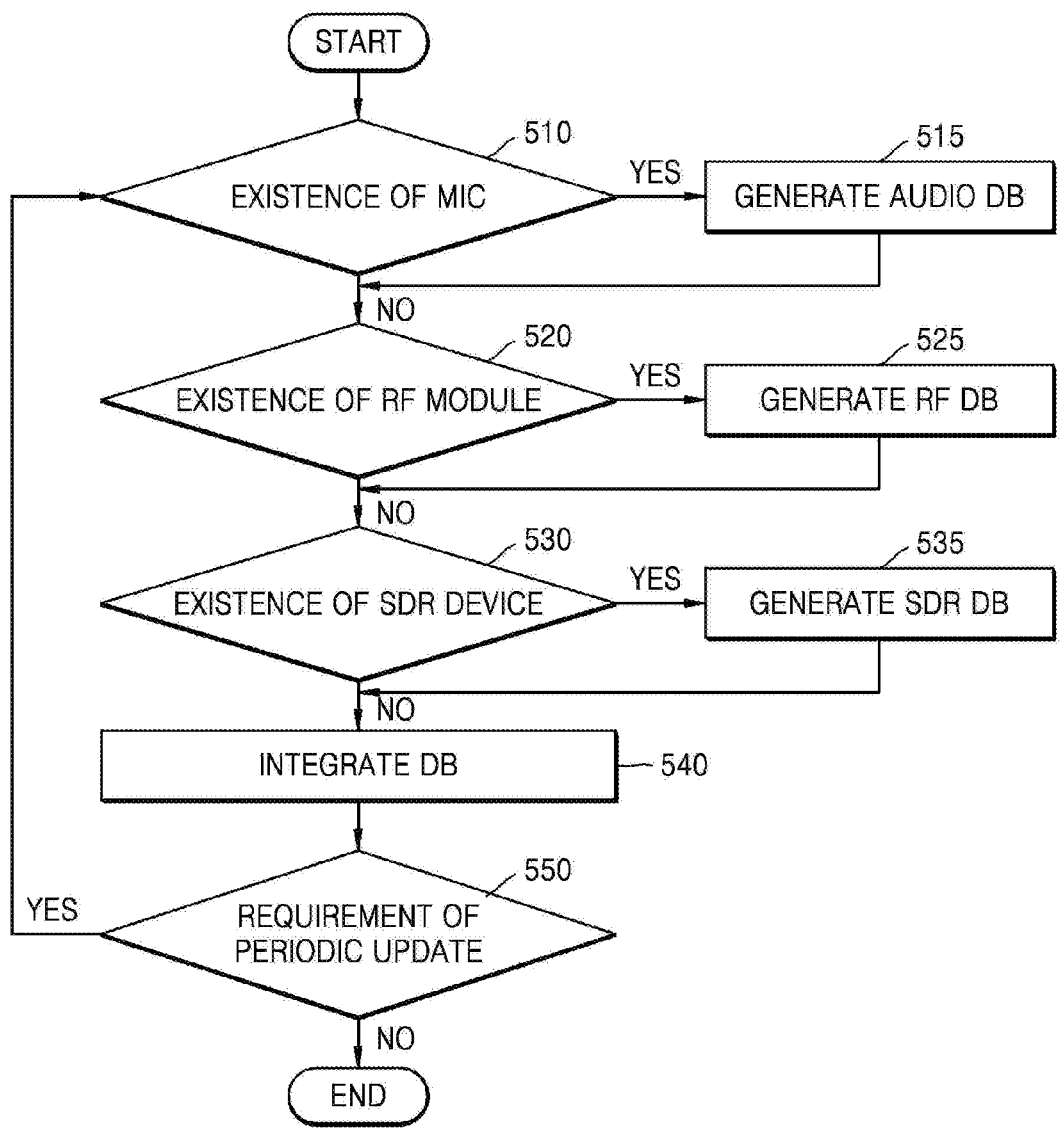
FIG. 5 is a flowchart illustrating an example process of generating a database after scanning audio/radio frequency bands by a communication apparatus.

FIG. 5 is a flowchart illustrating an example process of generating a database after scanning audio/radio frequency bands by the wireless communication apparatus 300.

The wireless communication apparatus 300 may execute a search for hardware that is able to sense a wireless signal prior to executing a scan of a wireless signal. Afterwards, the wireless communication apparatus 300 may scan a wireless frequency band in a scanning range using hardware found based on the search. For example, when an application that scans an audio/radio frequency band is executed, the wireless communication apparatus 300 searches hardware that is able to scan a wireless signal. For example, the wireless communication apparatus 300 may scan a MIC that may scan an audio frequency band, and/or a wireless module that may scan a radio frequency band. The wireless communication apparatus 300 may execute an application to sequentially operate the audio frequency band module and the radio frequency band module. When there is no interference between the audio frequency band module and the radio frequency band module, the wireless communication apparatus 300 may execute the application to operate the audio frequency band module and the radio frequency band module in parallel.

For example, in operation 510, the wireless communication apparatus 300 may search the existence of a MIC. In the operation 510, when it is determined that there is a MIC, in an operation 515, the wireless communication apparatus 300 may scan an audio frequency band and may generate an audio database.

If the wireless communication apparatus 300 is, for example, a digital TV or a smart phone, since the wireless communication apparatus 300 includes a MIC, the wireless communication apparatus 300 may scan an audio frequency band. The wireless communication apparatus 300 may search a device that communicates by using an ultrasonic wave through scanning of an audio frequency band, or may search a device that transmits a signal by using a sound of an audible frequency band. The wireless communication apparatus 300 may measure noise of peripheral environment of the audio frequency band, and may generate a database based on the measured noise.

In operation 520, the wireless communication apparatus 300 may search the existence of an RF module. In operation 520, when it is determined that there is an RF module, the wireless communication apparatus 300 may scan the RF bandwidth, and in an operation 525, may generate an RF database.

The wireless communication apparatus 300 may scan an audio frequency band or a radio frequency band using hardware (for example, a Wi-Fi module, a Bluetooth module, and/or a MIC) that is mounted in advance.

For example, the wireless communication apparatus 300, in the case of scanning Wi-Fi, may generate a database based on frequency band used by a peripheral access point (AP) or a peer device by using a process of searching the AP or a Wi-Fi P2P peer. The wireless communication apparatus 300, in the case of scanning Wi-Fi, may search frequency bands, such as, 2.4 GHz and 5 GHz frequency bands that are supported by a Wi-Fi module.

In the case of a Bluetooth that uses a 2.4 GHz frequency band by using a frequency hopping method, the wireless communication apparatus 300 may generate a database based on a peripheral Bluetooth device and a frequency band used by the peripheral Bluetooth device through a process of a Bluetooth peer discovery.

In the case of 3G/LTE, the wireless communication apparatus 300 may generate a database based on a result of searching the existence of a peripheral device and a base station and a frequency band in use.

In this way, recognition between electronic devices is possible by using wireless communication modules included in the wireless communication apparatus 300, and the provision of subdivided services may be possible by applying the function of recognizing devices.

For example, when a Wi-Fi communication or a Bluetooth device having a known name is searched, the wireless communication apparatus 300 may begin to execute a service set in advance. For example, when a smart phone that a name of the user and device information are registered in the wireless communication apparatus 300 approaches to the wireless communication apparatus 300, the wireless communication apparatus 300 may automatically turn on a power switch based on a scanned signal. Also, the wireless communication apparatus 300 may control peripheral lightings and home appliances based on the scanned signals.

In operation 530, the wireless communication apparatus 300 may search the existence of an SDR device around the wireless communication apparatus 300. In operation 530, when the existence of the SDR is determined, the wireless communication apparatus 300 may generate an SDR database based on the scanned signal in operation 535.

When the wireless communication apparatus 300 searches an SDR radio frequency band, the wireless communication apparatus 300 may scan a wide range of frequency bands. According to the scanning capability of the SDR hardware 230, the wireless communication apparatus 300 may search all frequency bands from audio frequency bands to public wave signals, public radio signals, Wi-Fi signals, Bluetooth signals, and/or 3G/LTE signals.

For example, when using the SDR hardware 230, the wireless communication apparatus 300 may perform an operation of transforming the scanned data to meaningful data. For example, when a 2.4 GHz frequency band is scanned by using the SDR hardware 230, the wireless communication apparatus 300 may need to identify that the 2.4 GHz frequency band is used by a Wi-Fi device or by a Bluetooth device. For this purpose, a radio frequency scan application may include an SDR database.

Although the frequency bands used by Wi-Fi devices are different from region to region, for example, Korea, America, and Europe, the wireless communication apparatus 300 may recognize the Wi-Fi device using the SDR database. For example, when the 2.4 GHz frequency band is recognized as the Wi-Fi frequency band, the wireless communication apparatus 300 may be able to analyze according to each wireless protocol in the next operation. The analysis may be performed in the SDR driver 231 and the radio/audio sensing application 210.

In operation 540, the wireless communication apparatus 300 may integrate the generated databases. For example, the wireless communication apparatus 300 may generate a single database by integrating an audio database, an RF database, and an SDR database.

For example, through operations 510 through 540, the wireless communication apparatus 300 may recognize an audio/radio frequency band that is being used by the scanned devices. The wireless communication apparatus 300 may generate a database that includes additional information set in an application together with the use of frequency that is occupied by each device. The additional information may be, for example, the name of a device, a MAC address and/or a BD address. The wireless communication apparatus 300 may use the generated database for use in another application or for executing another application.

The wireless communication apparatus 300 may periodically update the generated database based on a period set in advance.

In operation 550, the wireless communication apparatus 300 may determine whether a periodic update with respect to the scanned information is needed or not. In the operation 550, when it is determined that a periodic update is needed, the wireless communication apparatus 300 may re-scan wireless frequency band, and based on the re-scanned result, the database may be updated. For example, the wireless communication apparatus 300 may sequentially update the database based on scanned information by being returned to operation 510 from operation 550.

FIG. 6 is a diagram illustrating an example of an RF map generated by the wireless communication apparatus 300. Referring to FIG. 6, an example type of the RF map is a table. However, the type of RF map may be a frequency map or a graph type, or the like. However, the type of RF map is not limited thereto.

Referring to FIG. 6, the table indicates that there is a voice having an intensity of −30 db and −50 db in audible frequencies of 20~22,000 Hz. The table also indicates that there is a signal having the intensity of −50 db in 800 MHz which is a frequency bandwidth of a wireless phone. The table further indicates that there are signals respectively having intensities of −40 db and −60 db in the 2.4 GHz frequency band which is a Wi-Fi frequency bandwidth. Channel information corresponding to these signals is respectively channel 1 and channel 7. The table also indicates that there is a signal having the intensity of −70 db at 2.4 GHz to 2.5 GHz which is a Bluetooth frequency band and a user ID is Tom.

Figure 7A:
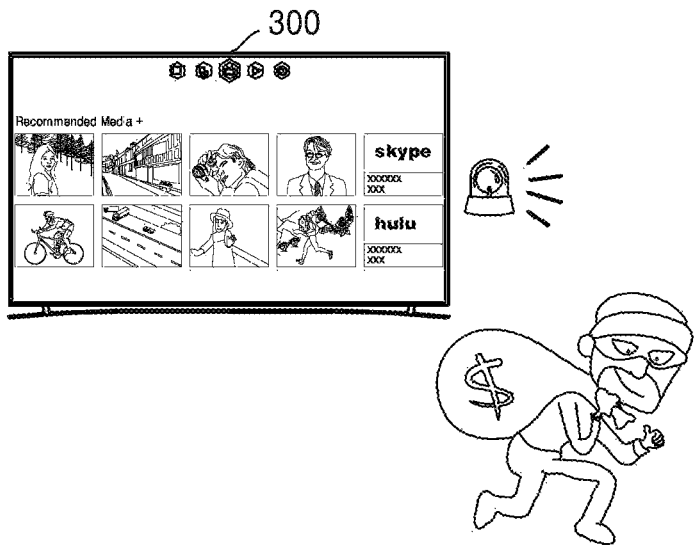
FIGS. 7A through 7C are diagrams illustrating various example applications that are executed using a database generated based on a scanned result.
Figure 7B:
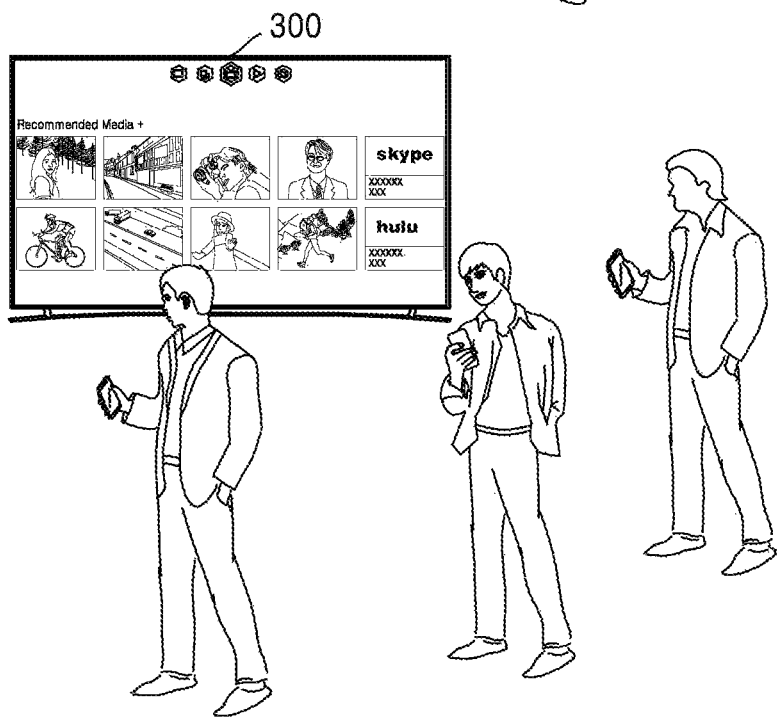
Figure 7C:
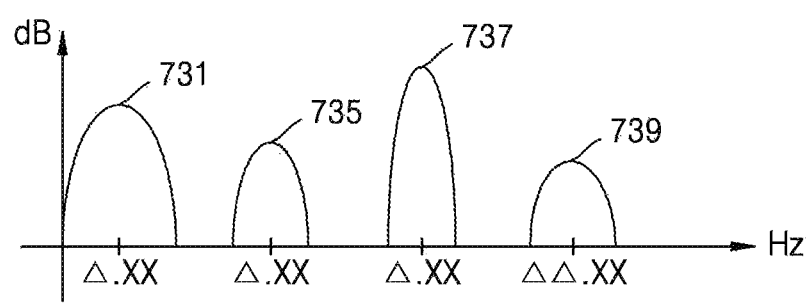

FIGS. 7A through 7C are diagrams illustrating example applications that are executed by using a database generated based on the scanned result by the wireless communication apparatus 300.

FIG. 7A is a diagram illustrating an example of generating a security signal from the wireless communication apparatus 300 when there is an invader in a house. For example, after the wireless communication apparatus 300 generates an RF map, when it is determined that a device of a scanned frequency band in use through a re-scan is not registered in the database, the wireless communication apparatus 300 may generate a security signal. For example, the wireless communication apparatus 300 may output an alarm through a speaker included in the wireless communication apparatus 300 or may transmit a wireless signal including a warning message to another wireless communication apparatus located in a police station or another wireless communication apparatus owned by the user to transmit a situation.

FIG. 7B is a diagram illustrating an example of transmitting an advertisement from a digital TV installed in a subway station to peripheral smart phones. The wireless communication apparatus 300 may transmit the advertisement to a device of the frequency bandwidth in use using the generated database. For example, a digital TV installed in a subway station may scan a smart phone of a person passing in front of the digital TV, and may transmit an advertisement to the scanned smart phone.

FIG. 7C is a graph illustrating an example RF map which is a type of integrated database. Referring to FIG. 7C, frequency bandwidths of whole frequencies occupied by electronic devices are shown. The wireless communication apparatus 300, as described above, may use the SDR hardware 230 and the SDR driver 231 to scan the entire frequency range.

The wireless communication apparatus 300 may select at least one frequency bandwidth from unused frequency bandwidths using a database, and may communicate using the selected frequency bandwidth. For example, referring to FIG. 6, since the wireless communication apparatus 300 knows that channel 1 and channel 7 are occupied in the 2.4 GHz frequency band which is a Wi-Fi frequency band, the wireless communication apparatus 300 may communicate with other electronic devices by using channel 2 to channel 6 of the Wi-Fi channels without having or avoiding a collision with other electronic devices.

Figure 8:
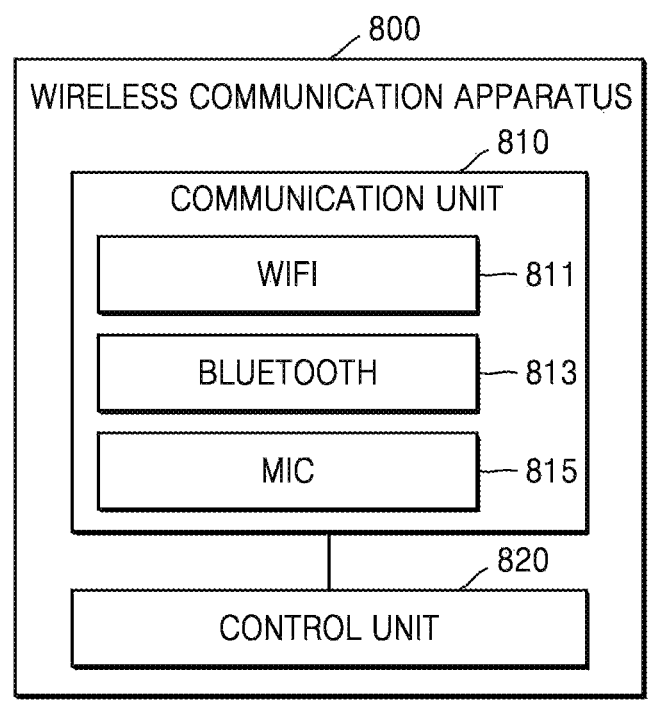
FIG. 8 is a block diagram illustrating an example configuration of a wireless communication apparatus.

FIG. 8 is a block diagram illustrating an example configuration of wireless communication apparatus 800. Referring to FIG. 8, the wireless communication apparatus 800 may include a communication unit (e.g., including communication circuitry) 810 and a control unit (e.g., including a controller) 820. The communication unit 810 and the control unit 820 respectively may be similar to the communication unit 310 and the control unit 320 of FIG. 3.

The communication unit 810 may include a Wi-Fi module 811, a Bluetooth module 813, and/or a MIC 815. The communication unit 810 may be configured to scan a wireless frequency band using the Wi-Fi module 811, the Bluetooth module 813, and/or the MIC 815.

The communication unit 810 may be configured to scan a Wi-Fi channel using the Wi-Fi module 811. For example, in the case of Wi-Fi scanning, the communication unit 810 may be configured to recognize a frequency band that is used by a peripheral AP or a peer device through a process of searching the AP or a Wi-Fi P2P. In the case of Wi-Fi scanning, the communication unit 810 may be configured to search a frequency band, such as 2.4 GHz and 5 GHz frequency band that is supported by a Wi-Fi module.

The communication unit 810 may be configured to scan a Bluetooth channel using the Bluetooth module 813. For example, the communication unit 810 may be configured to generate a database based on a peripheral Bluetooth device and a frequency that is used by the Bluetooth device through a process of a Bluetooth peer discovery.

The communication unit 810 may be configured to scan audible frequency bands and non-audible frequency bands using the MIC 815. The communication unit 810 may be configured to search electronic devices that communicate using an ultrasonic wave or electronic devices that transmit information using a sound of an audible frequency band through scanning an audio frequency band. The communication unit 810 may be configured to measure noise of peripheral environment of the audio frequency band, and may generate a database based on the measured noise.

Figure 9A:
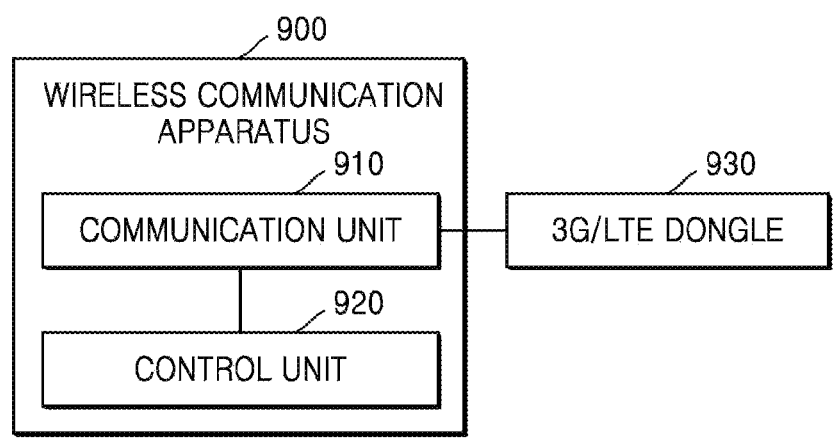
FIGS. 9A and 9B are block diagrams illustrating example configurations of connecting an external device to a wireless communication apparatus.
Figure 9B:
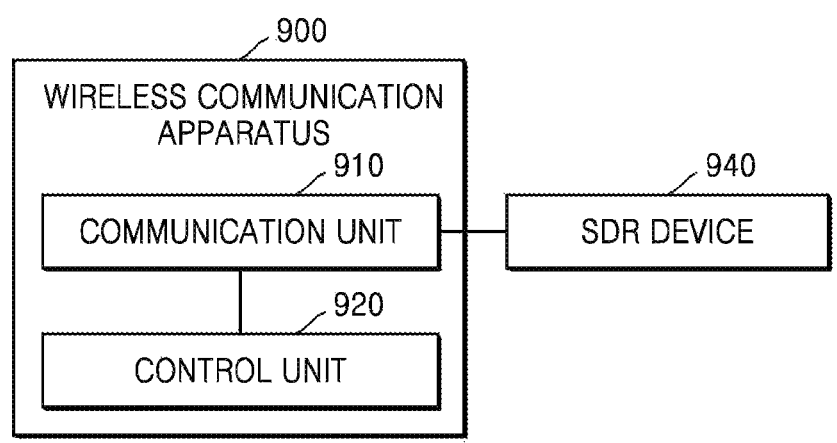

FIGS. 9A and 9B are block diagrams illustrating example configurations of connecting a wireless communication apparatus 900 to an external device.

FIG. 9A is a block diagram illustrating an example configuration of connecting the wireless communication apparatus 900 to a 3G/LTE dongle 930. Referring to FIG. 9A, the wireless communication apparatus 900 may include the 3G/LTE dongle 930 or may be connected to the 3G/LTE dongle 930.

The wireless communication apparatus 900 may scan a 3G/LTE frequency band in use using the 3G/LTE dongle 930 in a process of scanning a wireless frequency band in a scanning range. For example, the wireless communication apparatus 900 may obtain information of the existence of smart phones that use a 3G or LTE frequency band around the wireless communication apparatus 900 or information about the smart phones by using the 3G/LTE dongle 930.

FIG. 9B is a block diagram illustrating an example configuration of connecting the wireless communication apparatus 900 to an SDR device 940. Referring to FIG. 9B, the wireless communication apparatus 900 may include the SDR device 940 or may be connected to the SDR device 940.

The wireless communication apparatus 900 may scan a wireless signal of a wireless frequency band in use using the SDR device 940. The wireless communication apparatus 900 may determine a protocol of the wireless signal using the scanned wireless signal and an SDR database.

When scanning using an SDR radio frequency band, the wireless communication apparatus 900 may be configured to scan a wide range of frequency band. According to the scanning capability of SDR hardware, the wireless communication apparatus 900 may search all frequency bands from audio frequency bands to public wave signals, public radio signals, Wi-Fi signals, Bluetooth signals, and/or 3G/LTE signals.

When scanning using an SDR radio frequency band, the wireless communication apparatus 900 may transform the scanned data to meaningful data. For example, when scanning the 2.4 GHz frequency band by using the SDR radio frequency band, the wireless communication apparatus 900 may identify that the 2.4 GHz frequency band is used by a Wi-Fi device or by a Bluetooth device. For this purpose, a radio frequency scan application may include an SDR database.

The SDR database may be, for example, a table that enables identification of the type of devices in consideration of the location and the frequency band of a scanned wireless signal. For example, according to the table, if a wireless communication apparatus that uses a frequency band of 800 MHz is detected in Korea, the wireless communication apparatus 900 may determine that the detected wireless communication device is a wireless phone.

Although the frequency bands of Wi-Fi may change based on regions, such as, Korea, America, or Europe, the frequency bands of Wi-Fi may be managed by using an SDR database. For example, when the 2.4 GHz frequency band is recognized by a Wi-Fi, analysis according to each protocol may be possible in the next operation. It is possible that the analysis is realized by an SDR driver and a scan application.

According to the examples of the disclosure, a wireless communication apparatus may scan electronic devices that use various wireless connections to be connected to each other and may search for the existence of peripheral electronic devices and their services. A wireless communication apparatus may provide a new service based on scanned data, and a new service through integrating wireless communication technologies that are different types from each other.

Smart home apparatuses (for example, various home appliances, lightings, gas rangers, and/or door locks, etc.) on which wireless communication techniques, such as, a Wi-Fi or Bluetooth are employed may be searched by using a digital TV or a smart phone, a database may be generated by using the searched results, and the database may be applied to the operation of the home appliances and/or security of home.

For example, the generated audio/radio database may be applied to unused operations of home appliances (the control of abnormal operation of a gas ranger) or security of house (when a house is empty, a door lock, the generation of a security signal through house noise, and/or user notification) that may be caused when there is no use of a wireless frequency band at home and noise of an audible/non-audible frequency band.

The examples of the disclosure may be written as computer programs and may be implemented in digital computers that execute the programs using a computer readable recording medium.

The computer readable medium may be any usable medium that may be accessed by a computer, and may include any usable medium, such as, a volatile and non-volatile medium and a discrete type and non-discrete type medium. Also, the computer readable medium may include all computer storing media and communication media. The computer storing medium may include any medium, such as, a volatile and non-volatile medium and a discrete type and non-discrete type medium that is realized by a method or technique for storing information, such as, a computer readable command, a data structure, a program module, or other data. The communication medium may include other data of modulated signal, such as, a computer readable command, a data structure, a program module, or a carrier signal, or other transmission mechanism, and an arbitrary information medium.

The example embodiments are merely examples, and thus, it will be understood by those of ordinary skill in the art that various changes in form and details may be made therein without departing from the spirit and scope of the disclosure. Therefore, the example embodiments should be considered in descriptive sense only and not for purposes of limitation. For example, each constituent element that is described as a singular form may be embodied in distribution forms. Also, constituent elements that are described in distribution forms may be embodied in a combined form.

Therefore, the scope of the example embodiments are defined not by the detailed description but by the appended claims, and all differences within the scope will be construed as being included in the example embodiments.

What is claimed is:

1. A wireless communication apparatus using multiple wireless frequency bands, comprising:
    a memory configured to store instructions for controlling scanning the multiple wireless frequency bands; and
    a processor configured to execute the stored instructions to cause the processor to at least:
        control searching for wireless communication modules which are provided in the wireless communication apparatus;
        control a first wireless communication module included in wireless communication modules found by the searching to scan a first wireless frequency band to detect use of frequencies in the first wireless frequency band by devices peripheral to the wireless communication apparatus;
        control a second wireless communication module included in the found wireless communication modules to scan a second wireless frequency band, different from the first wireless frequency band, to detect use of frequencies in the second wireless frequency band by the devices peripheral to the wireless communication apparatus;
        generate a database based on the detected use of frequencies in the first and second wireless frequency bands; and
        control at least the first wireless communication module to communicate with an external device using a frequency in the first wireless frequency band based on information included in the database about use of frequencies for both the first and second wireless frequency bands.

2. The wireless communication apparatus of claim 1, wherein the information in the database comprises:
    scanned frequency bandwidths;
    strength of signals determined based on the scans;
    types of devices found based on the scans; and
    at least one of a media access control (MAC) address and a Bluetooth device (BD) address of devices.

3. The wireless communication apparatus of claim 1, wherein the searching searches for wireless communication modules including at least one of a Wi-Fi module, a Bluetooth module, and a module configured to scan an audible frequency band and a non- audible frequency band using a microphone (MIC).

4. The wireless communication apparatus of claim 1, wherein the processor is further configured to control the first wireless communication module to re-scan the first wireless frequency band, control the second wireless communication module to re-scan the second wireless frequency band, and update the database based on results of the re-scanning.

5. The wireless communication apparatus of claim 1, wherein the processor is further configured to, when the found wireless communication modules include a software defined radio (SDR) device connected to the wireless communication apparatus, scan a wireless signal of the first wireless frequency band and the second wireless frequency band by using the SDR device and determine a protocol of the wireless signal using the scanned wireless signal and an SDR database.

6. The wireless communication apparatus of claim 1, wherein the searching searches for communication modules including a 3G/LTE dongle, and the processor is further configured to, when the found wireless communication devices include a 3G/LTE dongle, scan a 3G/LTE frequency band by using the 3G/LTE dongle.

7. The wireless communication apparatus of claim 1, wherein the processor is further configured to select at least one frequency bandwidth from unused frequency bandwidths based on the information included in the database, and control at least one wireless communication module among the found wireless communication modules to perform a communication operation by the at least one wireless communication module by using the at least one selected frequency bandwidth.

8. The wireless communication apparatus of claim 1, wherein the processor is further configured to determine the external device by using the information included in the database, and control at least one wireless communication module among the found wireless communication modules to transmit an advertisement to the external device.

9. The wireless communication apparatus of claim 1, wherein the processor is further configured to control at least one of the first wireless communication module and the second wireless communication module to re-scan at least one of the first wireless frequency band and the second wireless frequency band, and control the at least one of the first wireless communication module and the second wireless communication module to transmit a security signal to the external device when the processor determines that a device that uses the re-scanned wireless frequency band is not registered in the database.

10. A method of communication using a wireless communication apparatus, the method comprising:
    searching for wireless communication modules which are provided in the wireless communication apparatus;
    controlling a first wireless communication module included in wireless communication modules found by the searching to scan a first wireless frequency band to detect use of frequencies in the first wireless frequency band by devices peripheral to the wireless communication apparatus;
    controlling a second wireless communication module included in the found wireless communication modules to scan a second wireless frequency band, different from the first wireless frequency band, to detect use of frequencies in the second wireless frequency band by the devices peripheral to the wireless communication apparatus;
    generating a database based on the detected use of frequencies in the first and second wireless frequency bands; and
    controlling at least the first wireless communication module to communicate with an external device using a frequency in the first wireless frequency band based on information included in the database about use of frequencies for both the first and second wireless frequency bands.

11. The method of claim 10, wherein the searching searches for wireless communication modules including at least one of a Wi-Fi module, a Bluetooth module, and a module configured to scan an audible frequency band and a non-audible frequency band using a microphone (MIC).

12. The method of claim 10, further comprising:
re-scanning the first wireless frequency band and the second wireless frequency band; and
updating the database based on results of the re-scanning.

13. The method of claim 10, wherein the searching searches for wireless communication modules including
a software defined radio (SDR) device connected to the wireless communication apparatus, and
wherein the method further comprises, when the found wireless communication modules include an SDR device:
scanning a wireless signal by using the SDR device; and
determining a protocol of the wireless signal using the scanned wireless signal and an SDR database.

14. The method of claim 10, wherein the searching searches for wireless communication modules including a 3G/LTE dongle, and the method further comprises, when the found wireless communication devices include a 3G/LTE dongle, scanning a 3G/LTE frequency band by using the 3G/LTE dongle.

15. The method of claim 10, further comprising:
selecting at least one frequency bandwidth from unused frequency bandwidths based on the information included in the database; and
performing a communication operation using the at least one selected frequency bandwidth.

16. The method of claim 10, further comprising determining the external device by using the information included in the database and transmitting an advertisement to the external device.

17. The method of claim 10, further comprising
re-scanning at least one of the first frequency band and the second wireless frequency band, and
transmitting a security signal to the external device when a device that uses at least one of the re-scanned wireless frequency bands is not registered in the database.

18. At least one non-transitory computer readable medium having recorded thereon a computer program which, when executed by a computer, performs at least:
searching for wireless communication modules which are provided in the wireless communication apparatus;
controlling a first wireless communication module included in wireless communication modules found by the searching to scan a first wireless frequency band to detect use of frequencies in the first wireless frequency band by devices peripheral to the wireless communication apparatus;
controlling a second wireless communication module included in the found wireless communication modules to scan a second wireless frequency band, different from the first wireless frequency band, to detect use of frequencies in the second wireless frequency band by the devices peripheral to the wireless communication apparatus;
generating a database based on the detected use of frequencies in the first and second wireless frequency bands; and
controlling at least the first wireless communication module to communicate with an external device using a frequency in the first wireless frequency band based on information included in the database about use of frequencies for both the first and second wireless frequency bands.

* * * * *